Oct. 6, 1953  R. S. THOMPSON  2,654,215
TURBINE POWER PLANT HAVING AUXILIARY
AIR INLET AND THRUST AUGMENTER
Filed Sept. 27, 1949  2 Sheets-Sheet 2
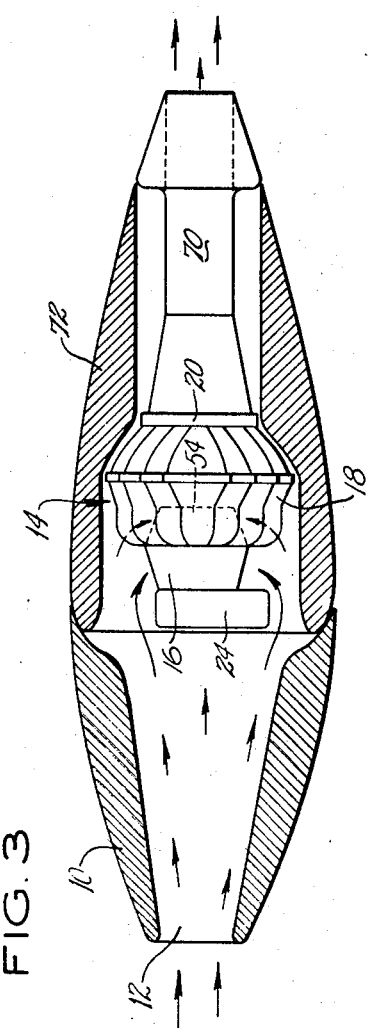
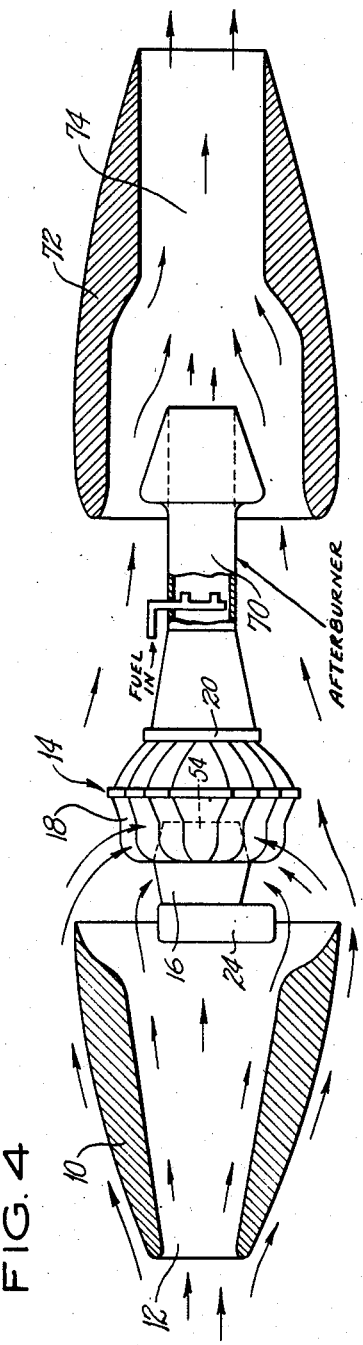
INVENTOR
RANSOM S. THOMPSON
BY *Leonard F. Weklind*
AGENT Patented Oct. 6, 1953

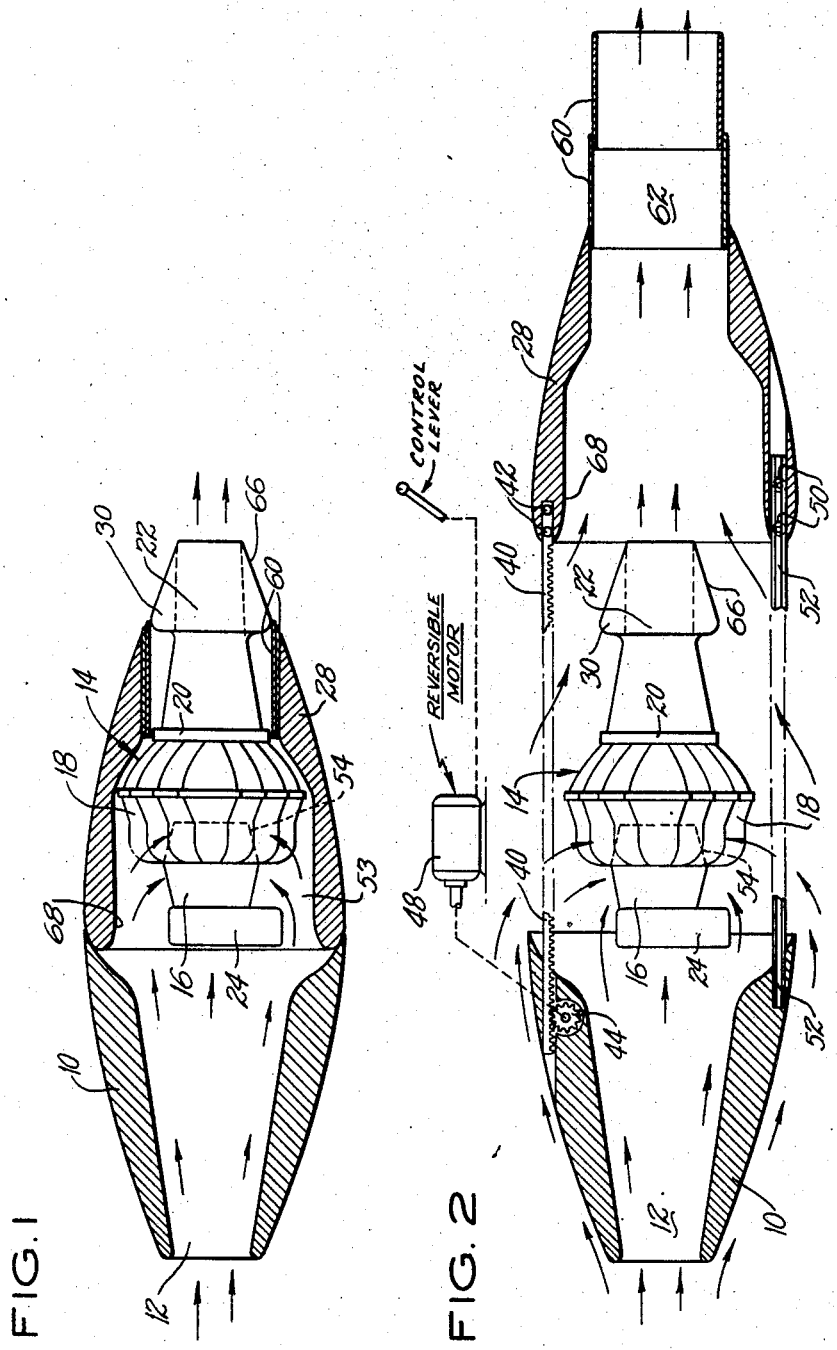

2,654,215

UNITED STATES PATENT OFFICE 2,654,215

TURBINE POWER PLANT HAVING AUXILIARY AIR INLET AND THRUST AUGMENTER

Ransom S. Thompson, Middle Haddam, Conn., assignor to United Aircraft Corporation, East Hartford, Conn., a corporation of Delaware Application September 27, 1949, Serial No. 118,096

5 Claims. (Cl. 60—35.6)

This invention relates to jet propulsion units and more particularly to improved thrust augmentation mechanism for aircraft jet power plants.

Inasmuch as the propulsive force developed by the nozzle discharge of a jet power plant is a function of the mass flow and the velocity conditions of the exit gases, it is desirable to maintain the value of these parameters as near the maximum as possible. Thus in aircraft jet power plant installations at low forward velocities, as for example during take-off, the ram intake supply for the engines is inadequate to produce a sufficient supply of air so that a maximum thrust is developed. In other words, the intake ducts and other engine components are designed for high speed conditions and hence are inefficient below certain speed values.

In order to provide adequate take-off power then it becomes necessary to augment the thrust being developed or discharged and one method entails the introduction of added mass to the jet propulsive stream issuing from the exhaust nozzle.

It is therefore an object of this invention to provide an improved thrust augmenting mechanism for aircraft jet propulsion power plants for increasing the static and low speed thrust thereof.

Another object of this invention is to provide a jet propulsion unit whereby a portion of the cowling surrounding the power plant is movable to an operative extended position to form an ejector type thrust augmenter.

An object of this invention is to increase the thrust output of a jet power plant at low airplane speeds by a means providing a combination of unrestricted air entrance to the jet engine compressor and an increased mass efflux from the thrust producing jet stream by the augmenter mechanism mentioned above.

It is an object of this invention to provide a thrust augmenter of the type mentioned above wherein the movable cowl portion in its operative thrust augmenting positions forms the auxiliary nozzle for discharging the augmented jet stream issuing from the unit.

Another object of this invention is to provide an improved thrust augmenting mechanism including a movable power plant enclosure which in its operative position forms an ejector for inducting additional air into the jet exhaust and further defines an enlarged supplemental jet discharge nozzle.

A further object of this invention is to provide a jet power plant closure which is movable to an aft extended thrust augmenting position including telescoping elements forming a part thereof for lengthening the supplemental augmented gas nozzle sufficiently to obtain maximum thrust; the telescoping elements being necessary where the movable cowl section is relatively short, as for example, where the power plant does not include an afterburner.

These and other objects of this invention will become readily apparent from the following detail description of the accompanying drawings in which, Fig. 1 is a cross sectional view of a jet propulsion unit with the movable closure of this invention in the retracted or high speed flight position;

Fig. 2 is a cross sectional view similar to Fig. 1 indicating the take-off or low speed position of the movable cowling section wherein thrust augmentation is made available;

Figs. 3 and 4 are cross sectional views similar to Figs. 1 and 2 indicating a movable cowl construction for jet power plants having afterburner installations.

Referring to Fig. 1, a jet propulsion unit for an aircraft is shown having a streamline cowling 10 defining an air intake passage 12 for the jet power plant 14. The power plant 14 comprises an intake and compressor section 16, a burner section 18, a turbine 20, and an exhaust nozzle 22. The power plant 14 may have an accessory section 24 mounted on the nose thereof and is substantially enclosed by a rear cowling portion 28 which forms a continuation of the streamline forward portion 10 and terminates at its aft end in contiguous relation with a fairing 30 fixed adjacent the trailing edge of the nozzle 22. In the position of the parts shown in Fig. 1 the jet propulsion unit will operate at its maximum efficiency for high speed flight conditions, the dimensions of the intake duct 12 and the capacity of the nozzle 22 being of proper values for the particular power plant installation. Since these dimensions capacities may be inadequate during low speed flight such as during take-off, thrust augmenting means are provided so that the jet stream issuing from the nozzle 22 will be augmented with additional air mass from the airstream passing over the cowling as shown in Fig. 2. To this end the rear cowling section 28 may be movable to an aft extended position by a suitable means such as a rack 40 fixed to the cowling 28 at 42 and a pinion gear 44. A reversible electric motor 48 is drivably connected to the pinion 44 (schematically shown) to axially extend and retract the cowling section 28 which is further supported by means of rollers 50 which ride in a cantilever track 52. The motor 48 may be controlled by a control lever as shown, which lever may be operated by the pilot. As shown in Fig. 1, the rear cowling section 28 defines a passage which normally houses the power plant and also provides a surrounding annular passage 53 which directs air into the jet engine compressor intake 16 and also the intake 54 while also conducting a portion of the intake air around the egine during high speed flight to provide cooling air for the latter.

The compressor intakes 16 and 54 as shown are of the double entry type for a centrifugal compressor installation, but various similar intakes may also be utilized. At low forward speeds of the aircraft, insufficient flow is obtained from the intake duct 12 and the cooperating passage 53 to cause efficient and high power operation of the engine. To this end, then, the present invention combines two features for increasing the thrust of the power plant by the augmenting mechanism described above while further providing an unrestricted air intake from outside the engine in the vicinity of the compressor intakes. In this manner the mass influx to the engine is increased at low forward speeds while the mass efflux from the engine is augmented by the ejector type augmenting mechanism.

Wherein the cowling 28 is relatively short in its axial dimension, a plurality of telescoping members 60 (Fig. 2) may be provided which can be extended when the cowling 28 is in its aftmost position so as to provide an auxiliary nozzle 62 of sufficient length to effectively eject a stream of maximum thrust therefrom.

In the Fig. 2 position of the cowling 28 the outer surface 66 of the fairing 30 and the lip 68 of the cowling 28 define an annular passage through which air from the airstream passing over the jet propulsion unit may be inducted by means of the ejector effect of the jet stream issuing from the nozzle 22 into the auxiliary nozzle 62. In other words, the jet exhaust from the power plant 14 is augmented by the inducted air and the combined mixture of gases is received and ejected through the larger nozzle 62. It is thus apparent that the axial dimension and the cross sectional dimension of the auxiliary nozzle 62 are relatively larger than the dimensions of the nozzle 24 so that augmented mass passing therethrough will produce a maximum thrust during low speed conditions.

Figs. 3 and 4 are similar to Figs. 1 and 2 and indicate a configuration wherein an afterburner 70 forms a part of the jet power plant 14. With a construction of this sort the movable aft cowling section 72 is of sufficient length when in the fully extended position (Fig. 4) so that adequate capacity is available in the auxiliary nozzle 74 to effectively develop maximum thrust with the augmented mass flowing therethrough.

The jet propulsion augmenting mechanism described and shown herein is an improvement of the basic concept fully described and claimed in co-pending patent application Serial No. 117,958, filed September 27, 1949, by John G. Lee.

As a result of this invention an improved thrust augmenting mechanism has been provided which is simple in operation and produces practically negligible drag when in its inoperative position while also providing additional unrestricted air intake means for the compressor. Further, the augmenting mechanism described herein is capable of installation with a minimum of added equipment to a standard aircraft nacelle or jet power unit.

Also, as a result of this invention the thrust augmenting device herein described may be utilized in place of other thrust augmentation devices such as afterburners and water injection to eliminate added water tanks, plumbing, control devices and the like. On the other hand, the mechanism of this invention may be readily utilized in conjunction with one or both of the other type of augmenters mentioned above.

Although certain embodiments of this invention have been shown and described herein, it is obvious that various modifications and changes may be made in the shape and arrangement of the various parts without departing from the scope of this novel concept.

What it is desired by Letters Patent is:

1. In a jet propulsion unit for an airplane, a jet engine having an air intake forming a part thereof and a compressor receiving air from said inlet, a cowling surrounding said engine and forming a ram air duct forward thereof and providing a path conducting air to said intake, means for providing a second path of unrestricted airflow from outside said cowling into said air intake at low forward speeds of the airplane including mechanism for axially separating said cowling and exposing said intake to the free airstream, an exhaust conduit for the engine, and cooperating mechanism carried by said cowling and the engine forming an ejector to withdraw air from the airstream and augment the stream issuing from said exhaust conduit.

2. In a jet propulsion unit for an airplane, a jet engine having an air intake forming a part thereof, a nozzle for exhausting a jet stream from said engine, a ram air duct forward of said engine, a cowling substantially enclosing said engine and forming a streamlined continuation of said ram air duct, means for increasing the mass air intake of said engine at low forward speeds including mechanism for moving said cowl section to an aft extended position whereby said air intake is exposed to unrestricted airflow from outside said unit, and cooperating means carried by said nozzle and the forward end of said cowl forming an ejector for inducting air from the airstream to augment the jet stream issuing from said nozzle, said ejector being operative upon aft extension of said cowling.

3. In a jet propulsion unit for an airplane, a jet engine having an air inlet, a nozzle for exhausting a jet stream from said engine, a forward cowling section for said engine defining an air intake duct communicating with said air inlet and terminating in a trailing edge spaced upstream from the forward end of said engine, a rear cowling section forming a passage in which said engine is normally confined, said rear cowling section having a forward lip normally in sealing relation with the trailing edge of said forward section and terminating in a trailing edge having a contiguous engagement with the aft end of said nozzle, mechanism permitting aft movement of said rear cowling section to a position whereby the forward lip thereof is adjacent the aft end of said nozzle whereby said air inlet is exposed to unrestricted flow from the free airstream, and cooperating means carried by the forward lip of said rear section and the aft end of said nozzle forming an ejector for drawing in air from the airstream passing over said cowling to mix with and augment said jet stream, the passage within said cowl rear section forming an enlarged nozzle for receiving and exhausting the augmented jet stream.

4. In a jet propulsion unit for an airplane, a jet power plant including an air intake, a nozzle for exhausting a jet stream from said engine, a cowling surrounding the engine including a forward and rear portion, said forward portion defining a ram air duct communicating with said inlet, said rear portion extending from adjacent said inlet to the aft end of said nozzle and being movable to an aft extended position forming an annular passage adjacent said nozzle providing communication with the airstream passing over said cowling, cooperating means carried by said rear portion and said nozzle for inducting air from said airstream through said passage to augmentably mix with the jet stream issuing from said nozzle, and telescoping means carried by said rear portion and extensible aft therefrom forming a lengthened augmenting nozzle for receiving and exhausting the augmented jet stream.

5. In a jet propulsion unit for an airplane, a jet power plant, a burner section for said power plant including a nozzle for exhausting a jet stream from said burner, a fixed forward cowl for said power plant defining an air intake therefor, a movable cowl defining a closure for said power plant normally forming a streamlined continuation of said fixed cowl and terminating adjacent the exhaust end of said nozzle, fairing carried by said nozzle in contiguous relation with the aft end of said movable cowl, means for moving said movable cowl to an aft extended position whereby the forward end of said movable cowl lies adjacent said fairing, said forward end of the movable cowl and said fairing forming an ejector in cooperation with said nozzle whereby air passing over said unit is inducted into said jet stream to augment the latter, and telescoping means extensible from said movable cowl forming an elongated secondary nozzle for receiving and emitting the augmented jet stream.

RANSOM S. THOMPSON.

References Cited in the file of this patent

UNITED STATES PATENTS

| Number | Name | Date |
|---|---|---|
| 2,408,099 | Sherman | Sept. 24, 1946 |
| 2,418,488 | Thompson | Apr. 8, 1947 |
| 2,443,250 | Johnson | June 15, 1948 |
| 2,487,588 | Price | Nov. 8, 1949 |
| 2,504,422 | Johnson et al. | Apr. 18, 1950 |
| 2,509,890 | Stalker | May 30, 1950 |

FOREIGN PATENTS

| Number | Country | Date |
|---|---|---|
| 577,949 | Great Britain | June 6, 1946 |
| 579,657 | Great Britain | Aug. 12, 1946 |